United States Patent [19]

Yamamoto et al.

[11] Patent Number: 4,815,921

[45] Date of Patent: Mar. 28, 1989

[54] ARTICLE CONTAINMENT APPARATUS

[75] Inventors: Katsuyuki Yamamoto, Nishinomiya; Kazutoyo Itoh, Toyonaka; Kazuo Kishimoto; Wakio Yamashita, both of Kanazawa, all of Japan

[73] Assignee: Shibuya Kogyo Co., Ltd., Japan

[21] Appl. No.: 941,251

[22] Filed: Dec. 12, 1986

[30] Foreign Application Priority Data

Feb. 4, 1986 [JP] Japan .................................. 61-22302

[51] Int. Cl.$^4$ ............................................... B65G 1/10
[52] U.S. Cl. .................................... 414/331; 414/280; 414/661; 414/286
[58] Field of Search ............... 414/267, 268, 277, 278, 414/279, 280, 285, 286, 331, 785, 661

[56] References Cited

U.S. PATENT DOCUMENTS

| | | | |
|---|---|---|---|
| 2,732,085 | 1/1956 | Siempelkamp | 414/286 |
| 3,810,730 | 5/1974 | Carlsson | 414/280 X |
| 4,203,696 | 5/1980 | Lindberg | 414/331 |
| 4,470,741 | 9/1984 | Bossler et al. | 414/280 |
| 4,527,938 | 7/1985 | Leavitt, Jr. | 414/280 |
| 4,634,333 | 1/1987 | Butterly, Jr. et al. | 414/331 |

FOREIGN PATENT DOCUMENTS

| | | | |
|---|---|---|---|
| 8204411 | 6/1984 | Fed. Rep. of Germany | 414/331 |
| 51-49267 | 12/1976 | Japan . | |
| 60-96325 | 7/1985 | Japan . | |
| 60-107029 | 7/1985 | Japan . | |
| 322731 | 4/1970 | Switzerland | 414/331 |

Primary Examiner—Frank E. Werner
Attorney, Agent, or Firm—Flynn, Thiel, Boutell & Tanis

[57] ABSTRACT

The invention relates to article containment apparatus which is adapted to store articles such as vials on shelves disposed at different elevations by placing them on the successive shelves. In a known article containment apparatus including an elevating mechanism which drives a plurality of shelves, disposed at different elevations for stowing articles thereon, up and down, and a conveyor for conveying articles to a shelf disposed at a given elevation, the invention is characterized by the provision of a plurality of infeeders disposed between the shelf and the conveyor. The infeeders are operated in an alternate fashion so that while one of the infeeders is operating to store articles from the conveyor, another infeeder conveys the stored article thereon onto the shelf. In this manner, there is no need to interrupt the supply of articles by the conveyor during the time the articles are conveyed onto the shelf, thus improving the efficiency of stowage.

11 Claims, 13 Drawing Sheets

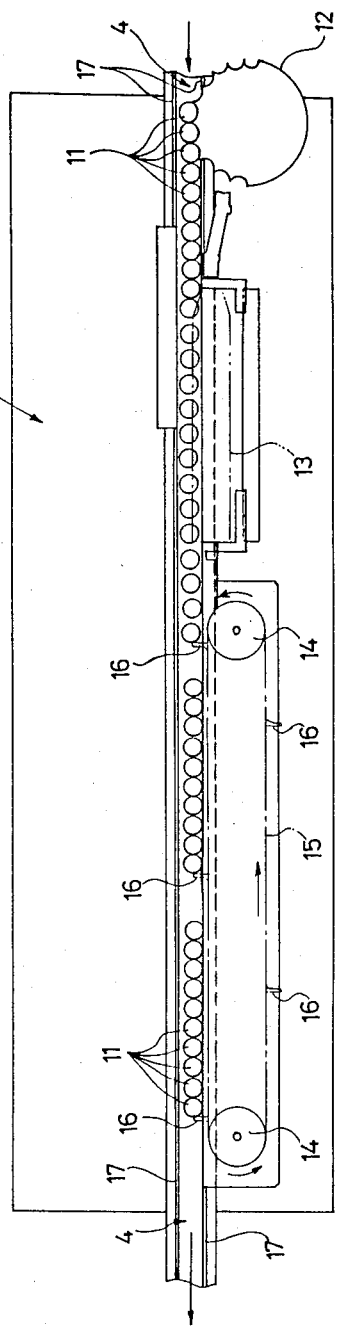
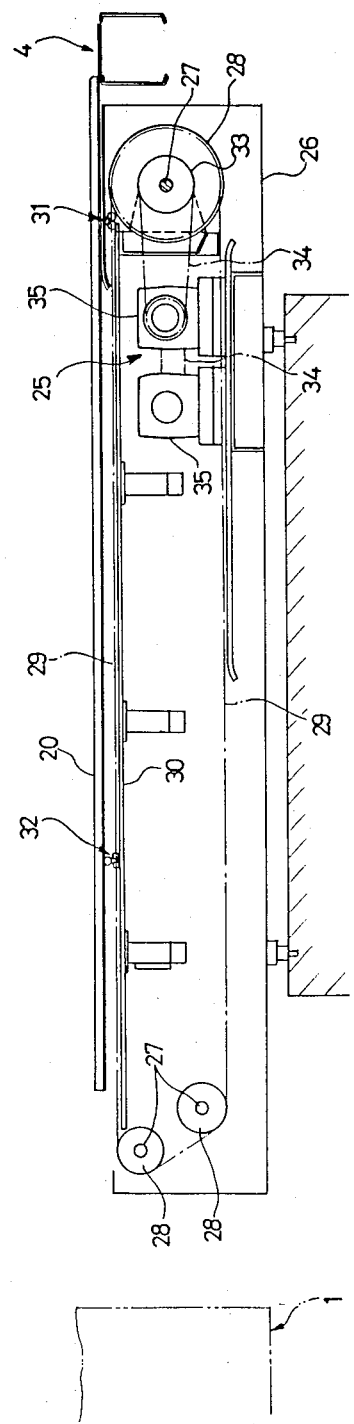
FIG. 3
FIG. 4

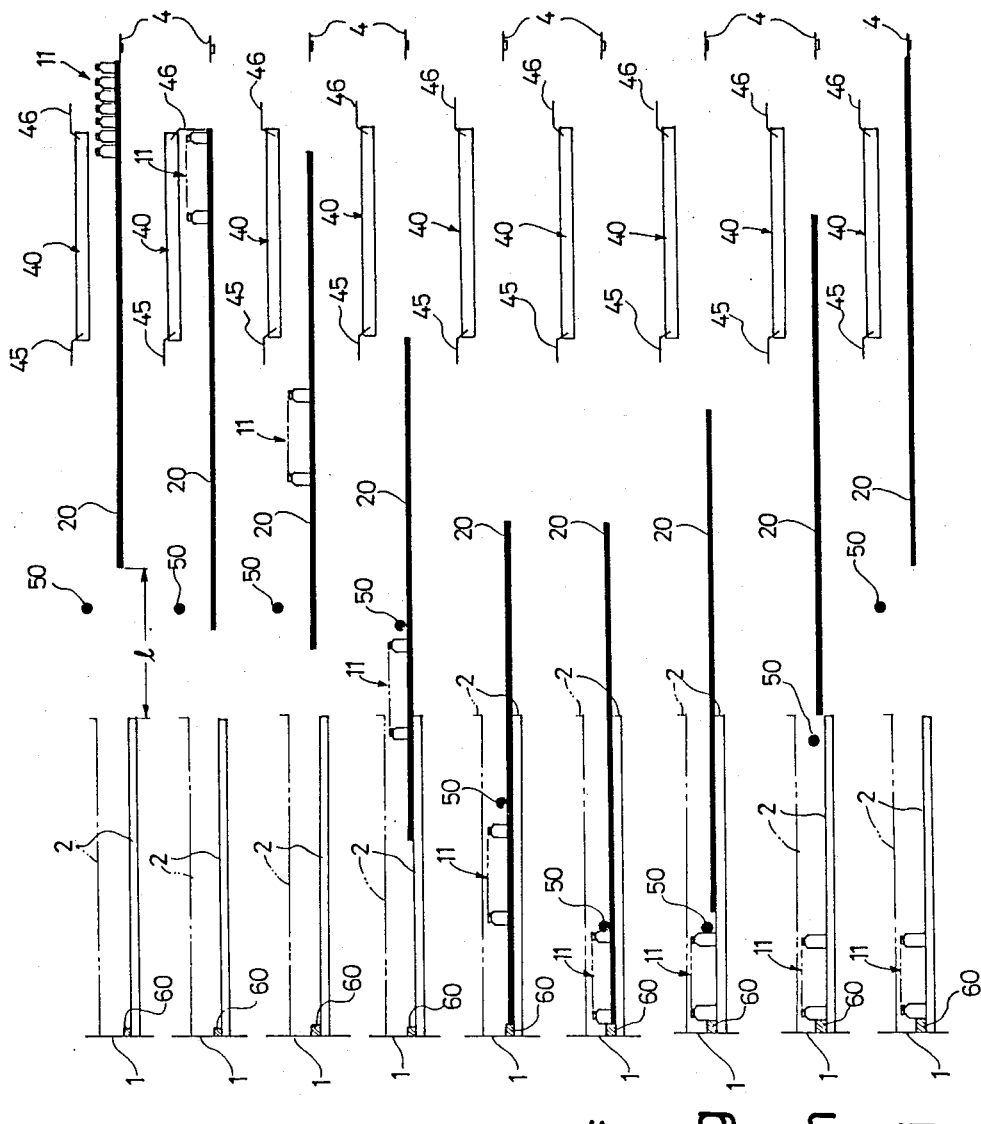

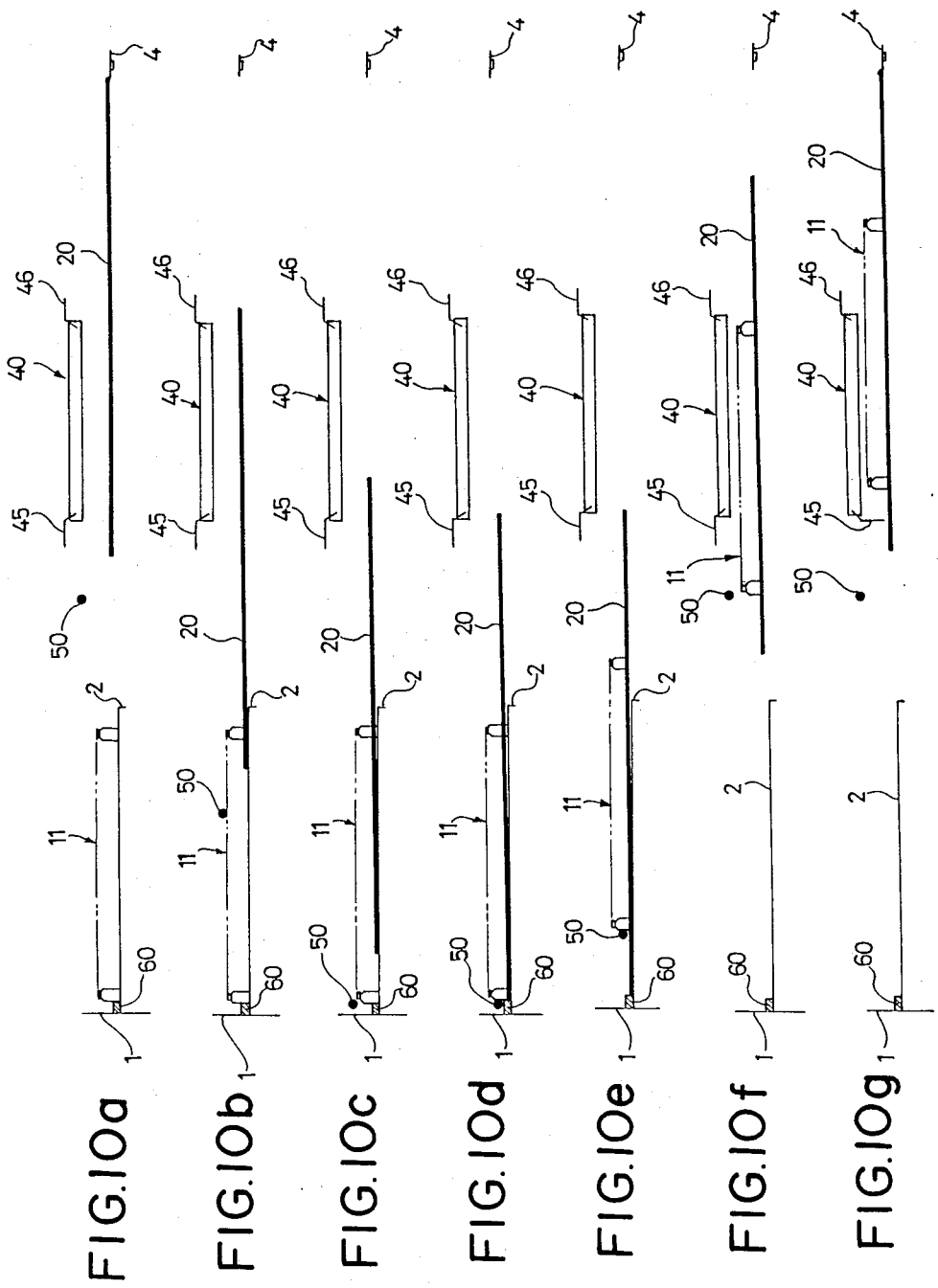

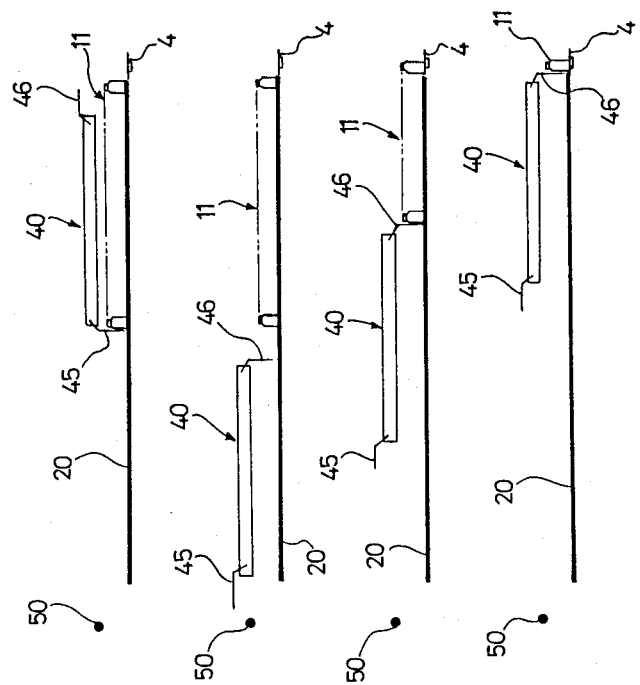
FIG.IOh
FIG.IOi
FIG.IOj
FIG.IOk

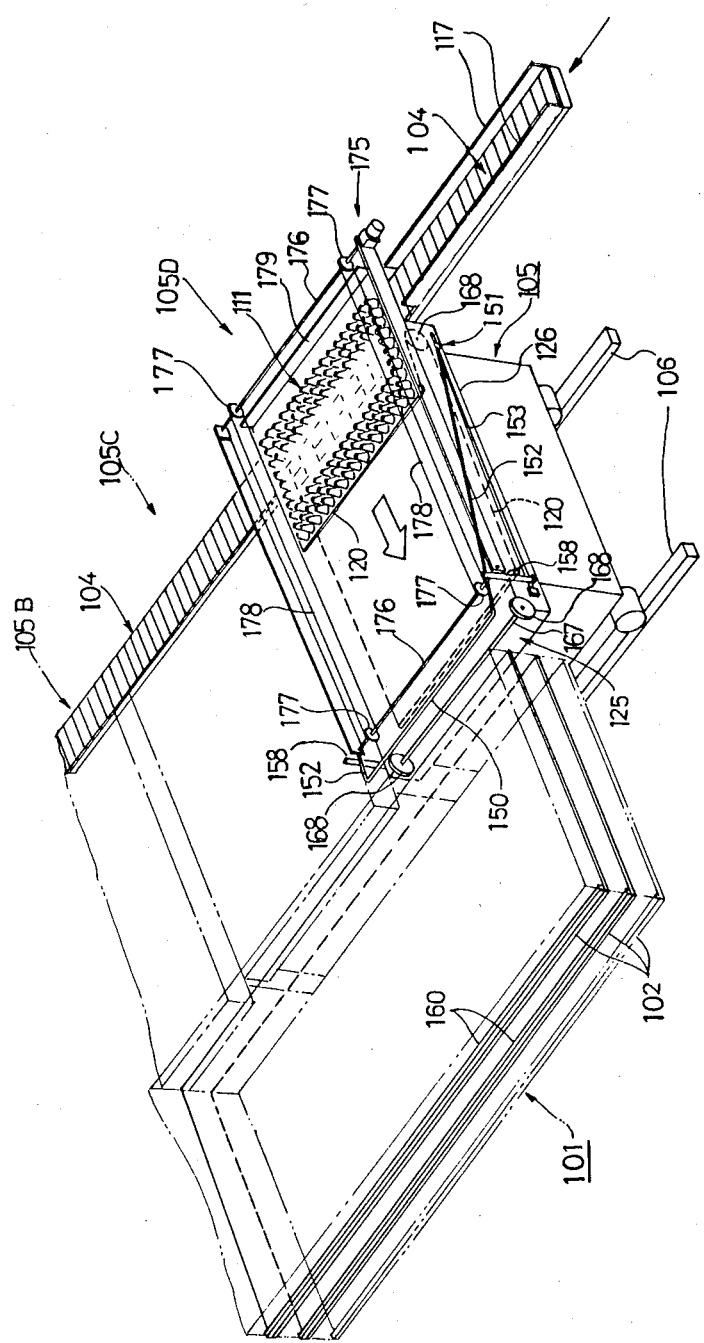

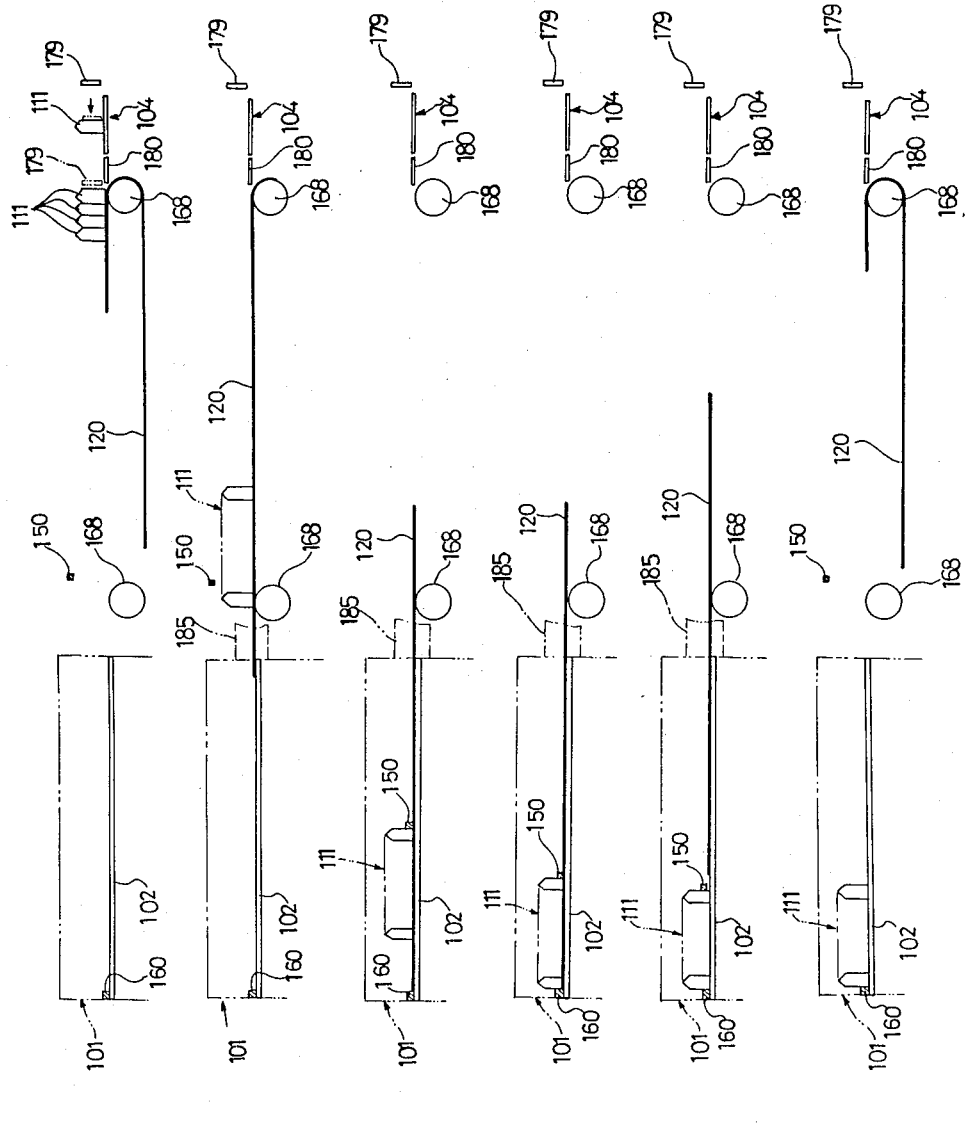

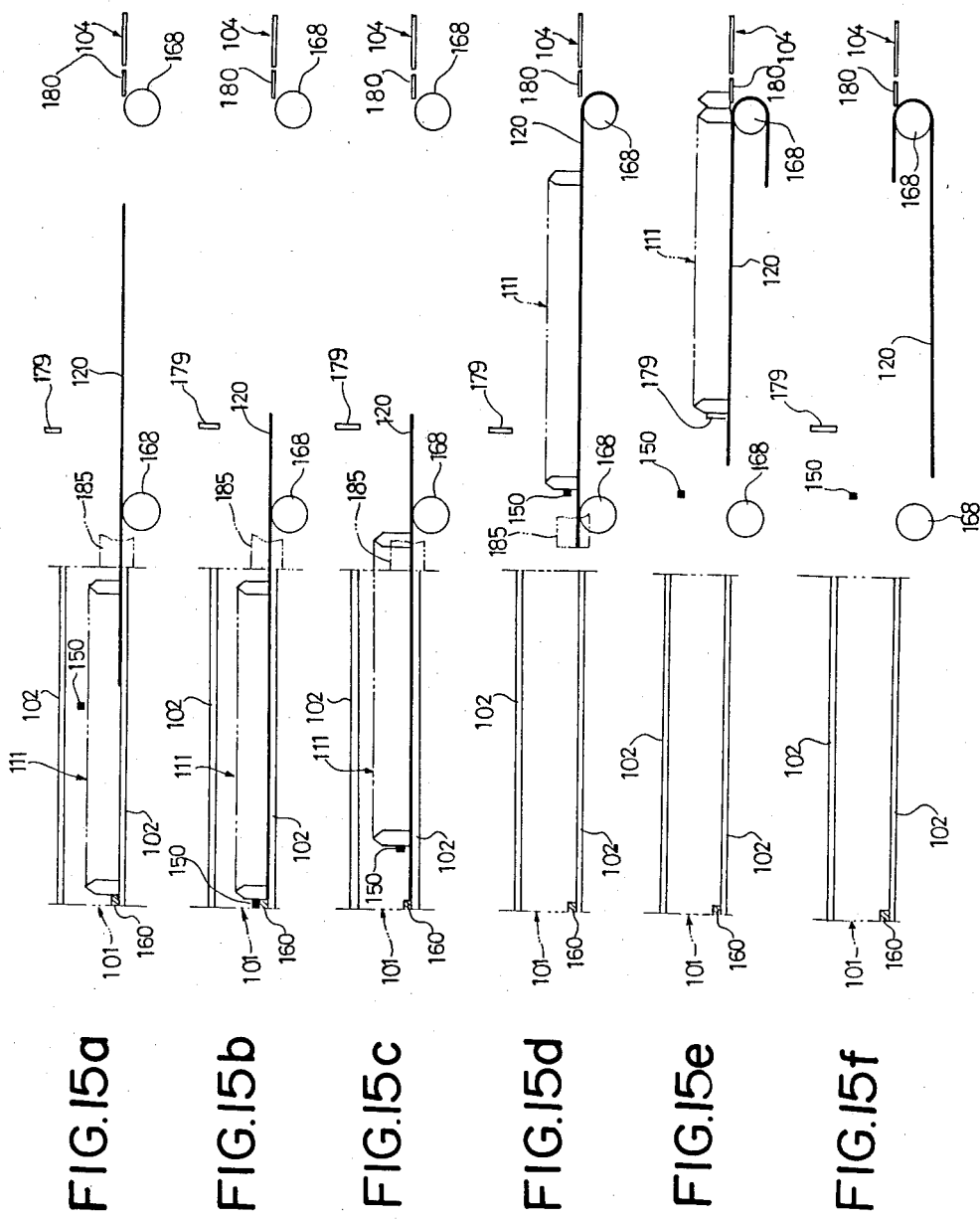

ARTICLE CONTAINMENT APPARATUS

FIELD OF THE INVENTION

The invention relates to an article containment apparatus, and more particularly, to such apparatus including a plurality of shelves at different levels or elevations on which articles such as vials are sequentially placed for stowage therein.

DESCRIPTION OF THE PRIOR ART

An article containment apparatus including a plurality of shelves at different levels on which articles are sequentially placed for stowage is known in the art, and includes an elevating mechanism which elevates the plurality of shelves and a conveyor which conveys and feeds articles to a shelf which is located at a given elevation. With such apparatus, when articles are sequentially fed to an empty shelf from the conveyor to fill it, the elevating mechanism operates to drive a fresh, empty shelf either up or down to the given elevation which is aligned with the conveyor so that articles can be fed to the new shelf from the conveyor.

With the apparatus constructed as described, it is necessary to stop the motion of the conveyor as well as feeding articles after a particular shelf has been filled with articles until the shelves are elevated to enable a fresh, empty shelf to be fed with articles. Accordingly, where it is desired to stow articles on an increased number of shelves, a waiting time of an increased length is required, resulting in a poor stowage efficiency.

Other examples of article containment apparatus include one in which articles which have been conveyed in a row by a conveyor are directly fed to a shelf in a sequential manner, or another apparatus in which articles from the conveyor are held in suspended form in a row which corresponds to the width of a shelf so that the suspended articles can be successively carried onto the shelf as sequential rows, beginning from the deepest row.

However, in the former arrangement, while articles can be fed into a stowage cabinet rapidly, the shelf may be frozen where the stowage cabinet represents a refrigerator or a freezer and dryer cabinet, where articles may not be slid along the shelf in a smooth manner, thus interfering with a smooth stowage. The same applies to a shelf formed by a network which prevents a smooth sliding movement of articles.

In the latter arrangement, the stowage of articles can take place reliably even with a shelf which prevents a sliding movement of articles, but a holding mechanism which hold one row of articles in suspended form must reciprocate through the stowage cabinet from row to row, thus requiring an increased length of time. When the stowage cabinet represents a refrigerator, a freezer and dryer cabinet or a hot cabinet, the door of the cabinet must be left open continuously until the shelf or shelves are filled with articles, resulting in a significant loss of thermal energy.

SUMMARY OF THE INVENTION

Therefore, it is an object of the invention to improve the efficiency with which the stowage of articles can be achieved. At this end, a plurality of infeeders are disposed between the shelves and the conveyor for temporarily storing a given number of articles supplied from the conveyor and for sequentially infeeding the stored articles onto a shelf. The infeeders are operated in an alternate fashion so that while the articles supplied from the conveyor are being stored by one of the infeeders, another infeeder acts to infeed the stored articles onto the shelf.

With this arrangement, during the time the articles from the conveyor are being stored by one infeeder, it is possible for the articles stored by another infeeder to be infed onto the shelf. Alternatively, when the shelf is filled with the articles which are infed, said one infeeder may be utilized to store articles supplied from the conveyor while a plurality of shelves, disposed at different levels, to be elevated so that a fresh, empty shelf to be brought into alignment with the infeeder. Thus, there is no need to interrupt the supply of articles from the conveyor, thus enabling an improved efficiency of stowage of articles.

This allows an increased number of articles to be placed and stowed on shelves at one time. Accordingly, a positive stowage of articles can be achieved in a reduced length of time, without any damage of brittle articles if there is difficulty in producing a smooth sliding movement of the articles along the shelves.

BRIEF DESCRIPTION OF THE DRAWINGS

FIG. 3 is a fragmentary plan view of FIG. 2, illustrating a grouping unit;

FIG. 4 is a side elevation of part of the apparatus shown in FIG. 1;

FIGS. 9a to 9i are schematic illustrations of the process of infeeding an article onto a shelf;

FIGS. 10a to 10k are schematic illustrations of the process of delivering an article from a shelf;

FIG. 11 is a perspective view of another embodiment of the invention;

FIGS. 14a to 14f are schematic illustrations of the process of infeeding an article onto a shelf; and FIGS. 15a to 15f are schematic illustrations of the process of delivering an article from a shelf.

DETAILED DESCRIPTION OF EMBODIMENTS

Figure 1:
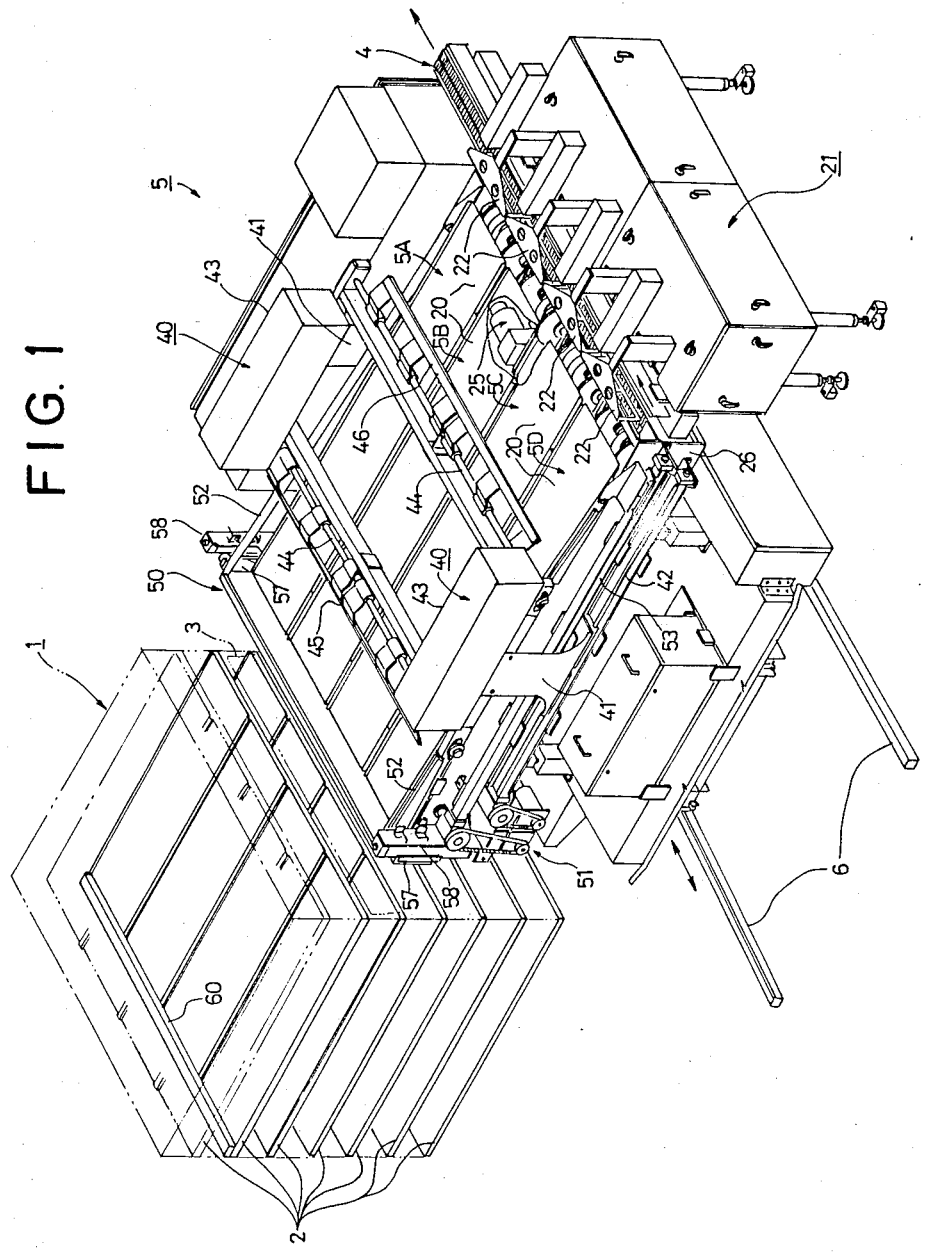
FIG. 1 is a perspective view of one embodiment of the invention.

Referring to FIG. 1, there is shown a stowage cabinet 1 which holds articles in stowage for refrigerating and drying them. Internally, the cabinet 1 includes a plurality of shelves 2 at different elevations, which are adapted to be sequentially elevated or moved up and down through a distance corresponding to a difference between adjacent levels, by an elevating mechanism, not shown, disposed therein. At its front, the cabinet 1 is formed with an opening 3 having a vertical height which corresponds to a difference between two adjacent levels of shelves so that articles can be infed onto or delivered from one of the shelves 2.

The opening 3 is adapted to be opened and closed by a shutter, not shown, and the front surface of the cabinet 1 in which the opening 3 is defined is constructed as a door, which may be opened as desired, thus opening the entire front surface of the cabinet 1.

Figure 2:
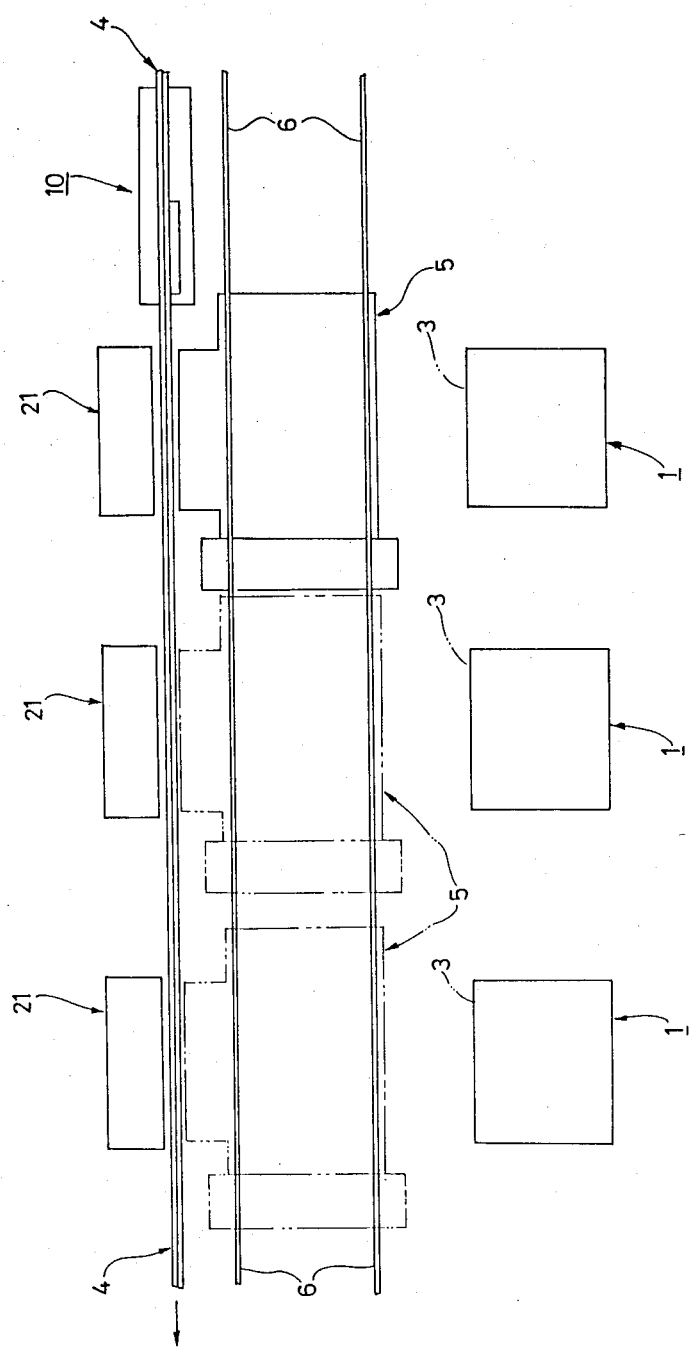
FIG. 2 is a schematic plan view of the entire apparatus.

Referring to FIG. 2, three stowage cabinets 1 are spaced apart a given distance therebetween on a line in the present embodiment, and a single conveyor 4 extends adjacent to one side of the cabinets 1 in which the opening 3 is formed and parallel to the line on which the cabinets 1 are aligned. A single transfer unit 5 is disposed between the cabinets 1 and the conveyor 4 for transferring articles which are conveyed on the conveyor 4 to each one of the cabinets 1. The transfer unit 5 is movable along a rail which is laid down so as to extend parallel to the conveyor 4, and in this manner, the transfer unit 5 may be stopped at a position which is located directly in front of one of the cabinets 1 to supply articles from the conveyor 4 into the corresponding cabinet or deliver them in the reverse direction.

At an upstream point, the conveyor 4 is associated with a grouping unit 10 which operates to group articles, which have been conveyed on the conveyor 4 in a single longitudinal row and in abutment against each other, into groups each including a given number of articles. As shown in FIG. 3, the grouping unit 10 comprises a stop wheel 12 which is disposed for rotation as driven by the articles 11 when they pass thereover and which can be braked by a brake, not shown, to block the passage of articles 11 whenever necessary, and a timing screw 13 which defines a given clearance between adjacent articles 11 which have been in abutting relationship with each other after they have moved passed the stop wheel 12.

The grouping unit 10 also includes a pair of sprockets 14 which are located downstream of and on one side of the timing screw 13 with a given spacing therebetween, with an endless chain 15 extending around the both sprockets 14. One of the sprockets 14 is connected to a drive motor, not shown, which operates to drive the endless chain 15 in the same direction as the conveyor 4 and with a speed chosen such that the chain circulates with a speed of movement slightly less than the conveying speed of the conveyor 4. A plurality of stops 16 are mounted on the endless chain 15 at selected positions so as to abut against and brake the articles 11 as they are conveyed on the conveyor 4.

With the described grouping unit 10, the articles 11 which have moved passed the stop wheel 12 while maintaining their abutting relationship are separated from each other to form a given clearance therebetween by the action of the timing screw 13 and are synchronized with the running of the endless chain 15. Each of the stops 16 mounted on the chain 15 is inserted into a clearance between adjacent articles 11 at an interval corresponding to a given number of articles, thus applying a braking action thereupon. In this manner, a number of articles, which corresponds to the interval between adjacent stops 16, are grouped together.

The article conveying speed of the conveyor 4 is chosen to be able to supply a number of articles 11 which is slightly increased over the capability of the timing screw 13 to process the articles 11. Accordingly, at a point upstream of the timing screw 13, the articles 11 abut against each other and thus urge against each other. Accordingly it is necessary to provide guide rails 17 on the opposite sides of the conveyor 4 to guide the movement of the articles 11 and to prevent their disengagement from the conveyor 4.

By contrast, when the articles 11 are conveyed by the conveyor 4 after they have been grouped together by the grouping unit 10, they do not exert any substantial force against each other, and hence essentially, there is no need to provide guide rails 17 on the opposite sides of the conveyor 4. However, for purpose of safety, the guide rails 17 extend along the opposite sides of the conveyor 4 except for regions which are located directly in front of the respective stowage cabinets 1.

Returning to FIG. 1, in the present embodiment, the transfer unit 5 includes four infeeders 5A, 5B, 5C and 5D which are capable of reciprocating in a direction perpendicular to the conveyor 4 while carrying articles 11 thereon. Each of the infeeders 5A to 5D includes a thin, rectangular receptacle plate 20 which may be formed of stainless steel or synthetic resin and which is formed with upturned longitudinally extending lateral ends to prevent articles placed thereon from falling down crosswise thereof.

The individual receptacle plates 20 are disposed horizontally land in parallel relationship with each other so that their upper surfaces are substantially co-planar with the conveyor 4 and so that when located at its retracted position, the rear end of the receptacle plate 20 is not significantly spaced from the conveyor 4, but is almost abutting thereagainst (see FIG. 4).

Referring to FIGS. 1 and 2, three extruders 21 are disposed on the opposite side of the conveyor 4 from the transfer unit 5 and generally aligned with the individual stowage cabinets 1 for extruding articles 11 which have been conveyed on the conveyor 4 toward the transfer unit 5. Each extruder 21 includes extruding levers 22 which are disposed for abutment against articles 11 of one group as it is conveyed on the conveyor 4 for transferring these articles onto the respective receptacle plate 20 of the associated infeeder 5A to 5D. It will be seen that a plurality of extruding levers 22 is individually associated with respective extruders 21 and are equal in number to the number of the infeeders 5A to 5D.

Each extruding lever 22 is mechanically connected to its drive source, not shown, separately from each other so that when it is actuated, it moves back and forth in a direction perpendicular to the direction of the conveyor 4 to urge the articles 11 in one group onto the receptacle 20. When it is deactuated, the extruding lever moves to its elevated position to avoid its interference with articles 11 which are being conveyed on the conveyor 4 (see FIG. 7). Thus it will be seen that since the articles 11 conveyed on the conveyor 4 must be extruded to be transferred onto the receptacle plate 20, by the action of the extruding lever 22, in a direction perpendicular to the conveyor 4, the guide rails 17 which have been mentioned above cannot be disposed in these regions where they are located in front of the respective stowage cabinets 1.

If the grouping unit 10 were not provided at an upstream point of the conveyor 4, the articles 11 conveyed on the conveyor 4 urge against each other in the manner mentioned above, so that when the articles are to be stowed into a downstream stowage cabinet 1 by the action of the transfer unit 5, some of the articles 11 may fall down in a region located in front of an upstream stowage cabinet 1. To prevent this, the guide rails 17 would have to be mounted detachably in such region to allow the guide rails 17 to be left in place or removed in accordance with the presence or absence of the transfer unit 5 in such region.

By contrast, in the present embodiment, the provision of the grouping unit 10 at an upstream point of the conveyor 4 prevents the articles 11 which are contained in one group, from urging against each other, so that the articles 11 cannot fall down the conveyor if the guide rails 17 are not disposed in front of the respective stowage cabinets 1, thus eliminating the need to control the presence or absence of the guide rails in such region. Likelihood that the guide rails 17 may be left removed inadvertently to cause a fall-down of the articles 11 from the conveyor 4 is also eliminated.

Figure 5:
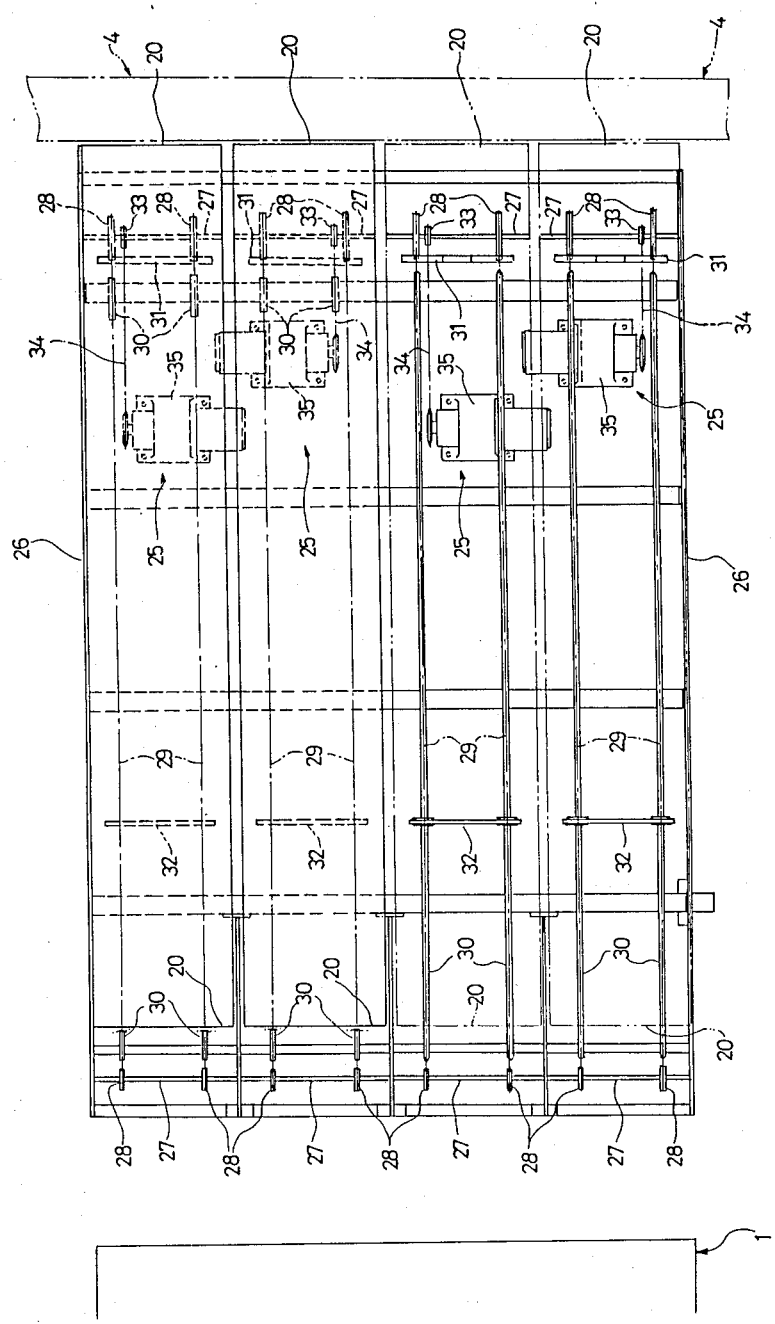
FIG. 5 is a plan view of part of the apparatus shown in FIG. 1.

Located below each receptacle plate 20 is a first drive mechanism 25 which is separately associated with each of the receptacle plates 20 for driving the corresponding receptacle plate 20 lengthwise back and forth. As shown in FIGS. 4 and 5, each of the first drive mechanisms 25 comprises a plurality of rotary shafts 27 which are rotatably journalled at given locations on a support frame 26 which is disposed between the stowage cabinets 1 and the conveyor 4, each pair of sprockets 28 disposed on the opposite sides of the individual rotary shaft 27, a pair of endless chains 29 which extend around all of the sprockets 28 and which extend parallel to each other, and a guide member 30 mounted on the support frame 26 for guiding an upper, rectilinear run of the respective endless chain 29 for linear movement therealong.

Each receptacle plate 20 is associated with the pair of endless chains 29, and has its bottom connected to the endless chains 29 in a rockable manner through a fastener 31 at its end located toward the conveyor 4 while the bottom surface of the receptacle plate 20 at its other or front end or end located toward the stowage cabinet 1 is supported by being placed on rod-shaped support members 32 which are connected to the endless chains 29 at given positions. One of the rotary shafts 27 has a sprocket 33 mounted thereon, which is connected through a chain 34 to a servo motor 35, and thus the rotation of the servo motor 35 in either forward or reverse direction is effective to cause a reciprocating movement of the receptacle plate 20 through the endless chains 29.

Figure 6:
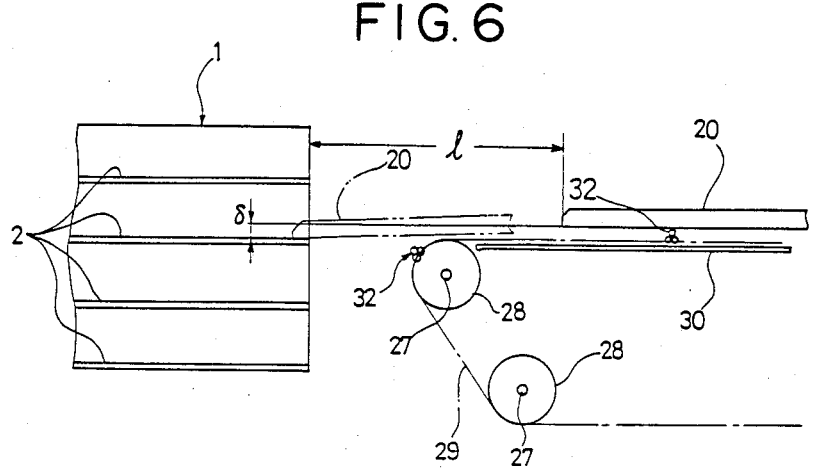
FIG. 6 is a side elevation illustrating the process of operating a transfer unit.

As mentioned previously, the upper surface of the receptacle plate 20 is located substantially co-planar with the conveyor 4, and in its retracted position, the rear end of the receptacle plate 20 is disposed close to the conveyor 4. Referring to FIG. 6, it will be seen that a spacing l which is in excess of the thickness of the door, not shown, of the stowage cabinet 1 is left between the front end of the receptacle plate 20 in its retracted position and the shelf 2 in the stowage cabinet 1 while the receptacle plate 20 is disposed at an elevation which is by a given amount $\delta$ higher than the elevation of the surface of the corresponding shelf 2 in the cabinet 1 which is effective to cause a reliable movement of the receptacle plate 20 onto the shelf.

Accordingly, when the first drive mechanism 25 has advanced the receptacle plate 20 toward the shelf 2, it is assured that the leading end of the receptacle plate 20 will move into the cabinet at a point above the shelf 2 without causing a collision thereof with the shelf 2 if the receptacle plate 20 is flexed downward due to the gravity of the articles 11 thereon or if it is subject to vertical oscillation during its advancing movement. When the leading end of the receptacle plate 20 has moved into a point above the shelf 2, the support members 32 mounted on the endless chains 29 move around the pair of sprockets 28 which are disposed nearest the stowage cabinet 1 to move along the lower run thereof, whereby the receptacle plate 20 which has been driven in a horizontal direction has its leading end then lowered to be placed on the surface of the shelf 2 for subsequent sliding movement along the shelf surface.

Figure 7:
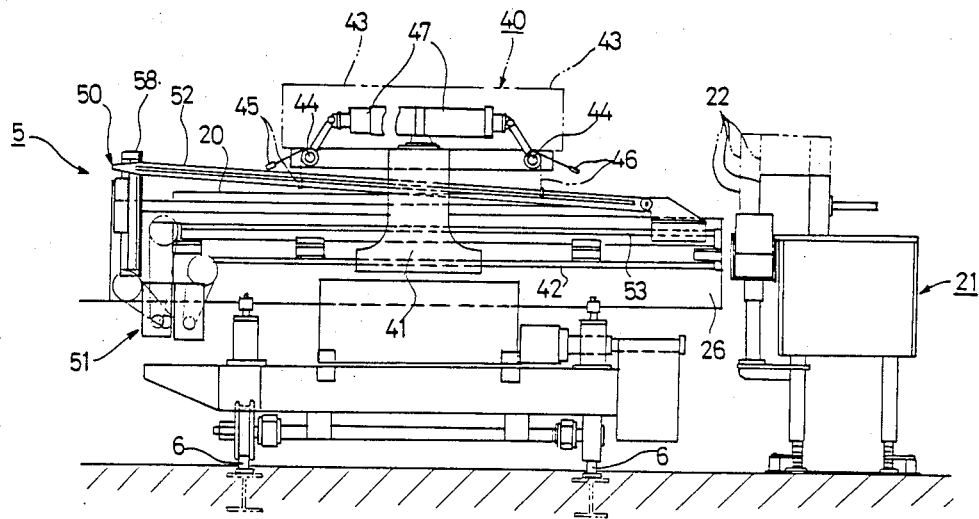
FIG. 7 is a side elevation of the apparatus shown in FIG. 1.

As shown in FIG. 1, traverse means 40 is disposed above the four receptacle plates 20 for traversing the articles 11 supplied onto the respective receptacle plate 20 thereon. The traverse means 40 includes a pair of movable stanchions 41, in the form of an inverted T, disposed on the opposite sides of the four receptacle plates 20, and as shown in FIGS. 1 and 7, the lower end of each movable stanchion 41 is threadably engaged with a threaded shaft 42, each journalled on either side of the support frame 26 and extending parallel to the direction of movement of the receptacle plates 20. Each threaded shaft 42 is mechanically coupled to a servo motor, not shown, which is effective to rotate the threaded shaft 42, whereupon the respective movable stanchion 41 can reciprocate in the direction of movement of the receptacle plate 20.

On its top end, each movable stanchion 41 carries a box 43, the opposite ends of which each have a pair of rotary shafts 44 mounted thereon which extend in a direction perpendicular to the direction of movement of the receptacle plates 20. Each rotary shaft 44 has a pair of plate-shaped rocking bars 45 or 46 mounted thereon, extending parallel to the shaft 44. The rocking bars 45 or 46 can be independently rocked by an associated one of a pair of cylinder units 47, both of which are disposed within the box 43 as shown in FIG. 7.

The rocking bars 45, 46 which are actuated by the respective cylinder units 47 assume an upper position which is shown in solid line in FIG. 7 when the cylinder units 47 are not actuated. However, when the respective cylinder units 47 are actuated, the individual rocking bars 45, 46 are lowered to a lower position which is indicated by phantom lines so as to be capable of abutting against articles on the receptacle plate 20.

The transfer unit 5 also includes a movable control member 50 which is utilized to move and place article 11 on each receptacle plate 20 onto the shelf 2. The movable control member 50 is driven for reciprocating motion in the direction in which the receptacle plate 20 moves and is also driven up and down by a second drive mechanism 51. Specifically, the movable control member 50 is disposed so as to be perpendicular to the direction in which the receptacle plate 20 moves, with a pair of arms 52 connected to the opposite ends thereof and extending in a direction parallel to the direction in which the receptacle plate 20 moves, at locations outside the four receptacle plates 20. The free end of the arm 52 which is located nearer the conveyor 4 is threadably engaged with a threaded shaft 53 which is rotatably mounted on a side of the support frame 26 and extending parallel to the threaded shaft 42. The threaded shaft 53 is mechanically coupled to a servo motor, not shown, which constitutes the second drive mechanism 51. When the servo motor causes the threaded shaft 53 to rotate, the movable control member 50 may be caused to undergo a reciprocating movement in the direction in which the receptacle plate 20 moves.

Figure 8:
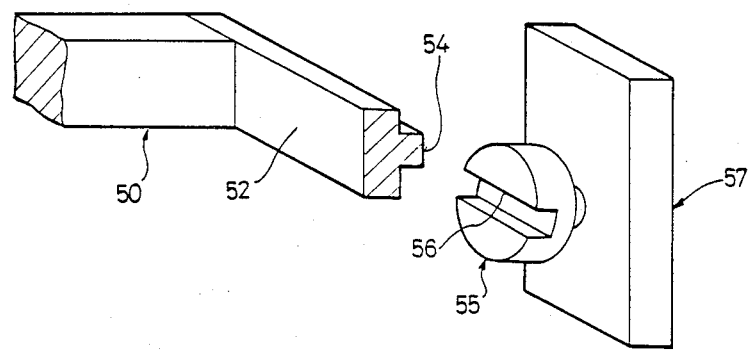
FIG. 8 is a perspective view of part of the apparatus shown in FIG. 1.

As shown in FIG. 8, each arm 52 is formed with a tenon 54 which extends linearly lengthwise along the outside of the respective arm and which is slidably engaged with a mortise 56 formed in a rotatable member 55. Each rotatable member 55 is formed by a solid cylinder and is pivotally mounted on an elevating member 57 so as to be rotatable about its axis. As shown in FIG. 1, each elevating member 57 is elevatably mounted on each one of a pair of stanchions 58 which are fixedly mounted on the opposite sides of the support frame 26 at its end adjacent to the stowage cabinet 1. The both elevating members 57 are adapted to be driven up and down synchronously and through an equal stroke by an elevating mechanism, not shown, which constitutes the second drive mechanism 51. Accordingly, when the movable control member 50 is driven for reciprocating motion, the tenons 54 on the opposite arms 52 are guided by the grooves 56. Accordingly, by adjusting the elevation of the grooves 56, the elevation of the movable control member 50 can be adjusted through the arms 52.

As shown in FIG. 1, a fixed stop member 60 having a height which is less than that of the articles 11 is mounted on each shelf 2 at its deep end, and is effective to prevent the abutment of the articles 11 against the wall surface of the stowage cabinet 1 which is located deepmost while defining a clearance between the wall surface and the articles, in which the movable control member 50 can be placed.

The operation to stow the articles 11 within each stowage cabinet 1 using the arrangement mentioned above will now be described. The transfer unit 5 is initially located so as to be aligned with the most upstream stowage cabinet 1. The four extruding levers 22 of the extruder 21 which is disposed in front of the particular stowage cabinet 1 which is aligned with the transfer unit 5 are sequentially operated, starting from the most downstream lever.

Before the operation of the transfer unit 5 is initiated, the receptacle plates 20 of the respective infeeders 5A to 5D and the movable control member 50 are located at their rear end position as indicated in FIG. 9a, with the movable control member 50 being raised to an elevated position where it cannot bear against the articles 11. The pair of rocking bars 45, 46 are also located at their rear end position adjacent to the conveyor 4. In addition, the rocking bars 45, 46 assume a horizontal position at this elevated position where they cannot bear against the articles 11. Finally, in the stowage cabinet 1, the shelf 2 at the highest elevation or level is disposed at an elevation which is by the given amount δ (see FIG. 6) lower than that of the receptacle plates 20.

Under this condition, when a given number of articles 11 in one row, which is determined by the grouping unit 10, is conveyed on the conveyor 4, the extruding lever 22 which is aligned with a most downstream infeeder 5A is actuated to move and place the articles 11 in one row onto the receptacle plate 20 in a sequential manner (FIG. 9a). It is to be noted that during such operation, the extruding levers other than the particular lever which is actuated are retracted to their upper position where they cannot bear against the articles 11.

When a given quantity of articles 11, which may be one-third the number of articles to be placed on the shelf 2, for example, are placed on the receptacle plate 20 of the infeeder 5A, as a result of a repeated actuation of the extruding lever 22, the extruding lever 22 which has been actuated in retracted to its upper position while another extruding lever 22 corresponding to the infeeder 5B which is located next to and upstream of the first mentioned actuated lever 22 then begins to be actuated, allowing a given quantity of articles 11 to be stored or placed on the receptacle plate 20 of the infeeder 5B. Accordingly, if the receptacle plate 20 associated with the most downstream infeeder 5A is filled with the given quantity of articles 11, it is unnecessary to stop the movement of the conveyor 4 to interrupt the feeding operation of the articles 11.

On the other hand, when the given quantity of articles 11 are stored or placed on the receptacle plate 20 of the infeeder 5A, this receptacle plate 20 begins to be driven forward. The forward movement of the receptacle plate 20 is momentarily stopped when the rearmost article 11 in the group has moved passed the rear rocking lever 46 (see FIG. 9b). When this condition is reached, the rear rocking lever 46 is initially swung downward before it is driven forward through a given stroke, whereby the rocking lever 46 bears against the article 11 to drive the entire group of articles forwardly while they remain on the receptacle plate 20. Subsequently, the rocking lever 46 moves upward and then returns to its original rear position (see FIG. 9c). At this time, the rocking bar 46 swings downward when the receptacle plate 20 has been advanced through a given stroke forward, and hence the bar cannot abut against the articles 11 which are supplied onto the receptacle plate 20 of the infeeder 5B.

When the articles 11 are fed forward on the receptacle plate 20 by the action of the rocking lever 46, the forward movement of the receptacle plate 20 is resumed. When the leading end of the receptacle plate 20 moves to a point which is directly above the shelf 2 of the highest level within the stowage cabinet 1, the support member 32 attached to the endless chain 29 rotates around the sprockets 28 to be shifted downward, whereupon the receptacle plate 20 slides along the surface of the shelf 2 (see FIG. 6).

When the rear end of the group of articles on the receptacle plate 20 has moved passed a point below the movable control member 50, the movable control member 50 is then lowered to an elevation where it is capable of abutting against the article 11, and simultaneously begins to be driven forward or to the left at the same speed of movement as the receptacle plate 20 (see FIG. 9d). The receptacle plate 20 ceases to move as its leading end approaches the fixed stop member 60 mounted on the shelf 2 while the forward movement of the movable control member 50 continues to convey the articles 11 until the forwardmost one of them abuts against the fixed stop member 60, and thus deep into the shelf 2, where the control member 50 comes to a stop (see FIGS. 9e and 9f).

Under this condition, the retracting movement of the receptacle plate 20 is initiated while the control member 50 remains at rest, whereby the receptacle plate 20 is withdrawn from the bottom side of the article 11 which are constrained from moving rearward by the control member 50, thus transferring the articles 11 from the receptacle plate 20 onto the shelf 2. In this manner, a number of articles 11, which corresponds to one-third the number of articles to be placed on the shelf 2, are placed and contained thereon (see FIG. 9g). After the receptacle plate 20 has been completely withdrawn from between the articles 11 and the shelf 2, the control member 50 is also driven backward in an integral manner with the receptacle plate 20 until both of them return to their original positions (see FIGS. 9h and 9i).

The described operation is then repeated by the next upstream infeeder 5B, 5C and 5D, sequentially, and when the number of articles 11 are stored on the receptacle plate 20 of the most upstream infeeder 5D and then subject to the described operation, the articles 11 which are carried by the conveyor 4 in separate groups, then begin to the supplied to the receptacle plate 20 associated with the most downstream infeeder 5A. In this manner, the individual infeeders 5A to 5D are operable to convey the articles which are to be stowed on a single one of the shelves 2 in three cycles, each time conveying one-third the total number of articles. As a consequence of such operation, the four infeeders 5A to 5D are capable of filling the single shelf with the articles 11 with a total of twelve cycles of operation.

When the most upstream infeeder 5D has conveyed the articles 11 onto the shelf 2 during the last or twelfth cycle of operation, and elevating mechanism, not shown, which is disposed within the cabinet 1 operates to raise the entire shelves 2 through a vertical distance corresponding to a difference between two adjacent levels of the shelves, thus locating a fresh empty shelf in substantial alignment with the respective receptacle plates 20, but lower by the given distance δ. In the meantime, the conveyor 4 continues to supply the articles 11 to the most downstream infeeder 5A without interrupting the conveyance of the articles 11 by the conveyor 4.

When the articles 11 are placed and stowed on the shelves 2 of the successive levels, and all of the shelves 2 are filled with the articles, the operation of the conveyor 4 is interrupted, and the transfer unit 5 is moved to a position which is in front of the stowage cabinet 1 that is located one position downstream of the previous cabinet 1, to which the feeding of the articles 11 is now initiated. In this manner, the described operation is repeated to feed the articles 11 into all of the stowage cabinets 1.

When the articles 11 are to be delivered from one of the stowage cabinets 1, the articles 11 are carried out from the shelves 2 in a seequential manner, starting with the lowermost shelf 2 and shifting to the upper shelves 2. In addition, the four infeeders 5A to 5D perform the same operation simultaneously, thus delivering all of the articles 11 from the shelf in one cycle of operation.

Before initiating the delivery of the articles 11 by the transfer unit 5, the receptacle plates 20 and the movable control member 50 of all of the infeeders 5A to 5D assume their rear positions as indicated in FIG. 10a while the rocking bars 45, 46 are located at their forward position close to the stowage cabinet and also assume their raised position.

The forward movement of the receptacle plates 20 and the movable control member 50 is initiated under this condition, and the control member 50 moves forward between the top surface of the articles 11 and the bottom surface of the upper located shelf 2 until it reaches the deep end thereof. As the receptacle plate 20 moves forward, its leading end is inserted between the surface of the shelf 2 and the bottom of the articles 11 which are constrained from movement by the fixed stop member 60 that is fixedly mounted deep on the shelf 2 (see FIG. 10b).

When the control member 50 moves close to the wall surface of the stowage cabinet 1 or to a point above the fixed stop member 60, its forward movement is interrupted. It is then lowered to be inserted into the space between the wall surface of the cabinet 1 and the particular article 11 which is disposed in the deepest position on the shelf. On the other hand, the receptacle plate 20 is driven forward until its leading end abuts against the fixed stop member 60, thus carrying all of the shelves located on the shelf 2 thereon, whereupon its forward movement is interrupted (see FIGS. 10c and 10d).

Under this condition, initially, only the movable control member 50 begins to be driven backward to shift the articles 11 through a given stroke backward while maintaining them on the receptacle plates 20 (see FIG. 10e). Subsequently, both the receptacle plates 20 and the control member 50 are driven backward at the same speed, whereby the articles 11 place on the receptacle plates 20 are carried out of the stowage cabinet 1, and the control member 50 and the receptacle plates 20 return to their positions which they assumed before the initiation of their operation (see FIGS. 10f and 10g).

By initially displacing the articles 11 through a given stroke backward on the receptacle plate 20 or toward the center thereof, it is assured that the articles 11 cannot fall down from the receptacle plate 20 during the described operation. In addition, this also prevents a fall of the articles 11 from the receptacle plate 20 as a result of a flexure of the left end of the receptacle plate 20 due to the gravity of the articles 11 carried thereon as the leading end or left end of the receptacle plate 20 clears from or moves away from the shelf 2.

When the receptacle plate 20 has been returned to its rear position, the leftmost article 11 in the group placed on the receptacle plate 20 has moved past a point below the left-hand rocking bar 45 toward the conveyor 4. The rocking bar 45 is then lowered to permit its abutment against the articles 11, whereupon it is driven backward toward the conveyor 4. In this manner, the rocking bar 45 is effective to shift the articles 11 to the end of the receptacle plate 20 which then remains stationary (see FIG. 10h).

Subsequently, when the rocking bars 45 and 46 have been driven to its forward end, the other rocking bar 46 is lowered (see FIG. 10j) and as it is driven backward again, it is operable to displace the articles 11 onto the conveyor 4. During such process, the rocking bar 46 is effective to displace the articles 11 on the receptacle plate 20, which represents a quantity corresponding to one transverse row, intermittently onto the conveyor 4, whereby the articles 11 are delivered onto the conveyor 4 to be arrayed in one row thereon (see FIG. 10k).

When all of the articles 11 have been delivered from the lowermost shelf 2 in the stowage cabinet 1 in the manner mentioned above, an elevating mechanism, not shown, operates to lower the shelves 2 through a vertical distance corresponding to the difference between two adjacent levels of shelves, whereupon the described operation is repeated to deliver all of the articles 11 from the stowage cabinet 1.

Another embodiment of the invention will now be described with reference to FIG. 11 and subsequent figures. In this embodiment, a transfer unit 105 includes four infeeders 105A, 105B, 105C and 105D which are disposed for reciprocating movement in a direction perpendicular to a conveyor 104 while carrying articles 111 thereon. Each infeeder 105A to 105D includes a receptacle plate 120, which is characterized by a far greater flexibility than that used in the first mentioned embodiment.

Figure 12:
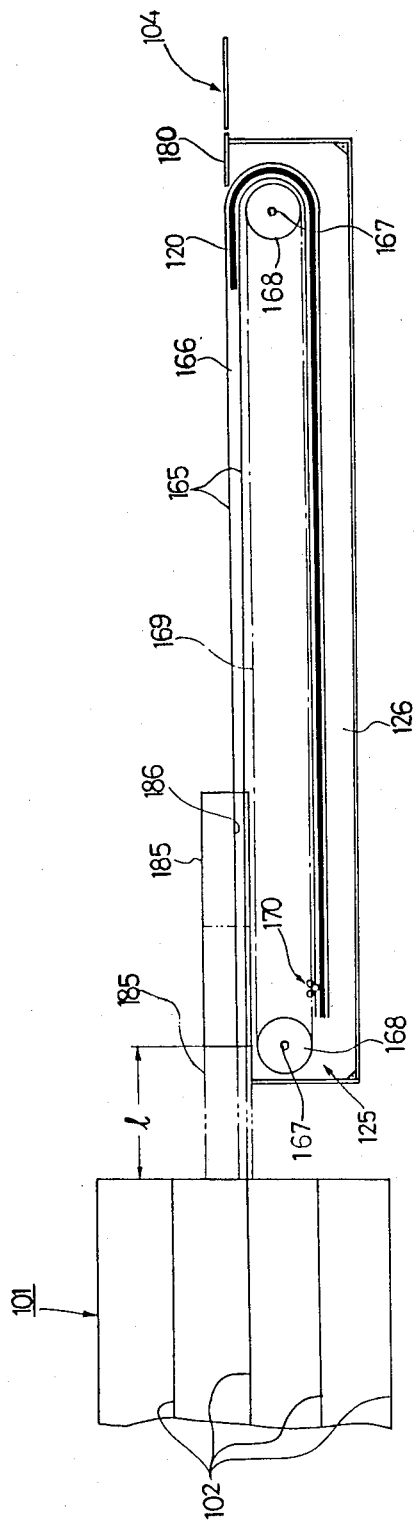
FIG. 12 is a side elevation of part of the apparatus shown in FIG. 11.

Referring to FIG. 12, a support frame 126 is disposed between a stowage cabinet 101 and a conveyor 104, and is provided with guide members 165 which are located on the opposite sides of respective receptacle plate 120. Each guide member 165 is provided with a channel 166 in which each of longitudinal sides of the receptacle plate 120, which has an increased flexibility as mentioned above, is slidably engaged, thus allowing the receptacle plate 120 to be smoothly driven along the channel 166.

The channel 166 extends substantially horizontally between a shelf 102 and the conveyor 104 at the elevation of the conveyor 104, and toward the conveyor 104, it is curved into a semi-circular configuration downwardly, and such semi-circular portion is followed by another horizontal run, thus generally defining a transverse U-shaped configuration.

The individual receptacle plates 120 can be separately driven back and forth along the channels 166 by an associated one of first drive mechanisms 125. As shown in FIGS. 11 and 12, each of the first drive mechanisms 125 comprises a pair of rotary shafts 167 rotatably journalled on the support frame 126, a pair of sprockets 168 mounted on the opposite ends of each rotary shaft 167, and a pair of endless chains 169 each extending around pairs of sprockets 168. The rotary shaft 167 is mechanically coupled to a servo motor, not shown.

As mentioned previously, the channel 166 comprises an upper rectilinear run which is located about the endless chain 169, a semi-circular run which extends around the sprocket 168 which is disposed nearer the conveyor 104, and a lower rectilinear run which is disposed below the endless chain 169, thus generally presenting a transverse U-shaped configuration. The end of the receptacle plate 120, which is located at the free end of the channel 166, is coupled to the endless chain 169 through a fastener 170. Accordingly, as the endless chain 169 runs, the receptacle plate 120 is driven for movement back and forth along the channel 166. When the leading end or free end of the receptacle plate 120 is driven toward the shelf 102, such end can be projected out of the channel 166 toward the shelf 102.

Referring to FIG. 11, it will be noted that transport means 175 is disposed above each receptacle plate 120, and serves the combined function of the extrusion mechanism 21 and the traverse means 40 mentioned above in connection with the first embodiment, thus conveying articles 111 which have been conveyed by the conveyor 104 onto the respective receptacle plates 120 or delivering the articles 111 from the receptacle plates 120 onto the conveyor 104.

Specifically, each of the transport means 175 includes a pair of rotary shafts 176 which are positioned at a location close to the stowage cabinet 101 and at a position beyond the conveyor 104, as viewed from the side of the cabinet 101, respectively. One of the rotary shafts 176 is mechanically coupled to a servo motor, not shown. A pair of sprockets 177 are mounted on each rotary shaft 176, and a pair of endless chains 178 extend parallel to each other across the ones of the respective sprocket pairs 177. An extruding bar 179 is mounted across the endless chains 178 for displacing the articles 111. By driving the extruding bar 179 for reciprocating motion, the articles 111 can be supplied from the conveyor 104 onto the receptacle plate 120 across a hand-off plate 180 (see FIG. 12) which is disposed between the conveyor 104 and a curved portion of the receptacle plate 120, or alternatively, the articles 111 can be displaced from the receptacle plate 120 onto the conveyor 104.

As shown in FIG. 12, it is necessary to provide a clearance 1 of a magnitude equal to or greater than the thickness of a door, not shown, of the stowage cabinet 101 between the leading end of the receptacle plate 120 and the shelf 102 in the cabinet 101. Accordingly, when the flexible receptacle plate 120 projects from the channel 166 toward the shelf 102, there is the likelihood that such leading end may be bent downwardly, preventing the leading end from reaching the shelf 102 in a reliable manner.

Figure 13:
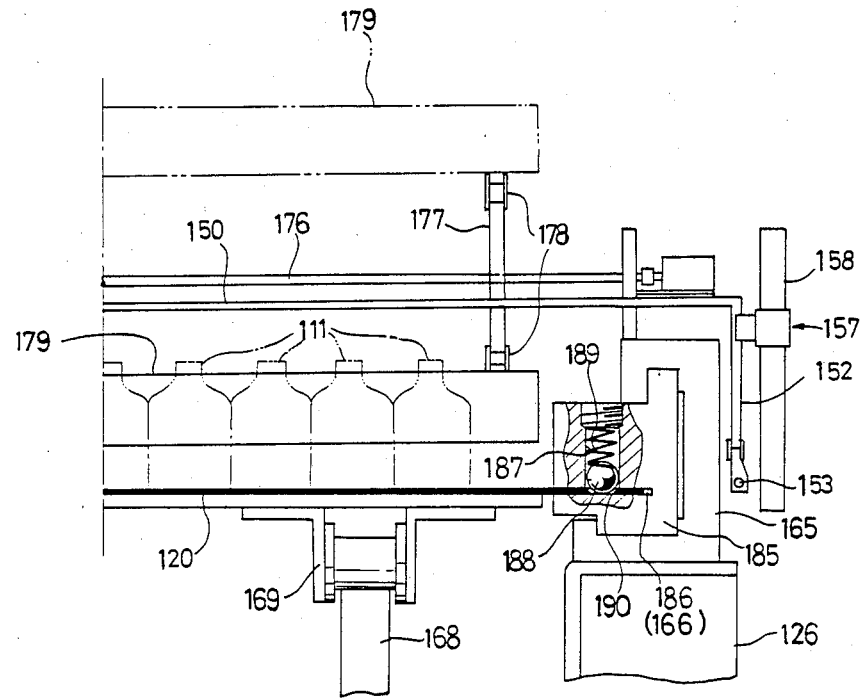
FIG. 13 is a fragmentary front view of the apparatus shown in FIG. 12.

For this reason, a substantially prism-shaped relay member 185 is provided for preventing the receptacle plate 120 from being flexed downwardly due to the gravity of the articles 111 or from oscillating vertically during its forward movement as the receptacle plate 120 is driven by the first drive mechanism 125 toward the shelf 102. Specifically, referring to FIGS. 12 and 13, the relay member 185 is disposed on the distal end of the respective guide members 165 which are mounted on the support frame 126 so as to be extendable toward or retractable from the shelf 102, and is formed with a channel 186 which represents an extension of the channel 166 formed in the guide member 165 for continued guiding action for the opposite lateral edges of the receptacle plate 120.

Specifically, each relay member 185 is formed with a vertically extending bore 187 which communicates with the channel 186 at its bottom and in which a ball 188 is slidably fitted, with a spring 189 urging the ball 188 downward. On the other hand, at its leading end, the opposite lateral edges of the receptacle plate 120 which is to be guided by the channel 186 for sliding movement is formed with openings 190 which can be engaged by the balls 188.

Accordingly, when the receptacle plate 120 advances from the channel 166 in the guide member 165 into the channel 186 formed in the relay member 185 and the balls 188 engage either the leading end or openings 190 formed therein of the receptacle plate 120, the relay member 185 can be projected forward toward the shelf 102 as it is integrally coupled with the receptacle plate 120 while supporting the latter. When the leading end of the relay member 185 abuts against the shelf 102, its forward movement is interrupted while the leading end of the receptacle plate 120 is allowed to be advanced further forward by passing under the ball 188 against the resilience of the spring 189. In this manner, it is assured that the receptacle plate 120 can be reliably passed from the channel 186 in the relay member 185 onto the shelf 102.

On the other hand, when the receptacle plate 120 retracts, as the ball 188 engages the opening 190 during the retracting movement of the receptacle plate 120 relative to the relay member 185, the relay member 185 can be retracted toward the conveyor 104 as it is integrally coupled with the receptacle plate 120 while supporting it. When the relay member 185 abuts against the guide member 165 and comes to a stop, the engagement between the balls 188 and the opening 190 is forcibly terminated, whereby the receptacle plate 120 is allowed to continue its retracting movement.

It is to be noted that the resistance for the sliding movement between the relay member 185 and the support frame 126 is chosen to be greater than the resistance for the sliding movement between the receptacle plate 120 and the channel 186, and that the resilience of the spring 189 is chosen such that the force required to disengage the ball 188 from the opening 190 is greater than the resistance for the sliding movement between the relay member 185 and the support frame 126. Alternatively, rather than choosing such magnitudes of the resistance or the resilience, the movement of the leading end of the receptacle plate 120 may be detected and the relay member 185 operated in synchronized relationship with the receptacle plate 120 as by a motor.

In other respects, the arrangement is similar to the first embodiment, and like components as before are designated by corresponding reference numerals which are added with 100.

In operation, when the articles 111 are to be stowed within the stowage cabinet 101, the transfer unit 105 is initially located in front of the most upstream stowage cabinet 101 in the similar manner as in the previous embodiment. Since the four infeeders 105A to 105D are adapted to fill the single shelf with the articles 111 with a total of twelve cycles of operation, the description of such operation which is similar to the previous embodiment will not be repeated, but only a different aspect of the operation will be described.

Before the transfer unit 105 begins to operate, the receptacle plates 120 in the respective infeeders 105A to 105D assume their rear position, with the leading end of the receptacle plate 120 being located slightly advanced relative to the hand-off plate 180 (see FIG. 14*f*), thus preventing the leading end of the receptacle plate 120 from being loaded by placing the articles 111 thereon. A movable control member 150 also assumes its rear position and also assumes an upper position where it cannot abut against the articles 111.

When one row of articles 111, which are grouped together by the grouping unit, is conveyed on the conveyor 104 under this condition, the extruding bar 179 of the most downstream infeeder 105A is actuated for reciprocating movement, thus transferring the articles 111 on the conveyor sequentially onto the receptacle plate 120 in one transverse row while simultaneously the receptacle plate 120 is driven forward intermittently by an amount corresponding to the size of the article as the successive articles 111 are supplied thereto (see FIG. 14*a*). Accordingly, if the number of articles which are stored or placed on the receptacle plate 120 increases, the articles 111 which are subsequently to be supplied onto the receptacle plate 120 can be passed to the receptacle plate 120 without any reaction from the pre-existing articles, thus effectively preventing any damge or fracture of the articles 111 which may be brittle in nature.

When a given quantity of articles 111 are stored on the receptacle plate 120 associated with the infeeder 105A as a result of repeated operation of the extruding bar 179, this extruding bar 179 is then retracted to its upper position while allowing the receptacle plate 120 to be continuously fed forward. When the leading end of the receptacle plate engages the relay member 185 and moves further forward while accompanying the latter integrally, the leading end of the receptacle plate 120 is guided onto the shelf 102 in a reliable manner while it is being supported by the relay member 185, and subsequently slide along the surface of the shelf 102 (FIG. 14*b*).

After the rearmost article in the group on the receptacle plate 120 has passed below the movable control member 150, the control member 150 is lowered to a position where it can abut against the articles 111 and is then driven to the left at the same speed of movement as the receptacle plate 120 (see FIG. 14*c*). When the leading end of the receptacle plate 120 approaches a fixed control member 160 mounted on the shelf 102, the movement of the receptacle plate 120 is interrupted while the forward movement of the control member 150 is continued, thus conveying the articles 111 forward until the foremost articles bears against the fixed control member 160, whereupon the control member ceases to operate (see FIG. 14*d*).

When this condition is reached, the control member 150 is held stationary while the receptacle plate 120 is driven for retracting movement, whereby the articles 111 are transferred from the receptacle plate 120 onto the shelf 102 (see FIG. 14*e*). When the receptacle plate 120 is completely withdrawn from between the articles 111 and the shelf 102, the control member 150 is then allowed to be retracted in an integral manner with the receptacle plate 120 until both of them return to their original positions (see FIG. 14*f*).

As in the previous embodiment, when the receptacle plate 120 associated with the most upstream infeeder 105D has conveyed the articles 111 onto the shelf 102 during the twelfth cycle of operation, and elevating mechanism, not shown, which is disposed within the stowage cabinet 101, operates to elevate the shelves 102 by one step, thus locating a fresh, empty shelf for loading operation.

When the articles 111 are to be delivered from the stowage cabinet 101, the articles are delivered sequentially starting with the lowermost shelf 102 and proceeding to the upper shelves 102, in the similar manner as the previous embodiment. The four infeeders 105A to 105D perform the same operation simultaneously to deliver all of the articles 111 from one shelf in one cycle of operation.

Before the initiation of delivery of the articles 111 by the transfer unit 105, all of the receptacle plates 120 and the movable control members 150 assume their rear position while the extruding bars 179 are located at their forward position which is closer to the stowage cabinet and also assume their upper position.

The forward movement of the receptacle plates 120 and the control member 150 is initiated under this condition, and the control member 150 moves forward between the top surface of the articles 111 and the bottom surface of the upper shelf 102 until it reaches the deep end of the shelf 102. On the other hand, the leading end of the receptacle plate 120 is inserted between the surface of the shelf 102 and the bottom of the articles 111 which are constrained from movement by the fixed control member 160 which is fixedly mounted in the deep end of the shelf 102 (see FIG. 15*a*). The control member 150 is inserted into the space between the wall surface of the stowage cabinet 101 and the innermost article 111. The receptacle plate 120 is driven forward until its leading end abuts against the fixed stop member 160, thus transferring all of the articles on the shelves 102 onto the receptacle plate 120 (see FIG. 15*b*).

When this condition is reached, the movable control member 150 initially begins its retracting movement to retract the articles 111 backward through a given stroke while maintaining them on the receptacle plate 120 (see FIG. 15*c*), whereupon both the receptacle plate 120 and the control member 150 begin to retract at the same speed, thus carrying the articles 111 on the receptacle plate 120 out of the stowage cabinet 101. During such process, the leading end of the receptacle plate 120 is supported by the relay member 185 when passing from the shelf 102 into the channel 166 formed in the guide member 165 (see FIG. 15d).

As the rightmost article 111 on the receptacle plate 120 approaches the conveyor 104, the extruding bar 179 which has been located above the receptacle plate 120 is lowered and is also retracted toward the conveyor 104, whereby it abuts against the rearmost article 111, as viewed in the direction of such movement, placed on the receptacle plate 120, and is driven backward in an integral manner with the receptacle plate 120, thus displacing the articles 111 onto the conveyor 104. During such process, the extruding bar 179 and the receptacle plate 120 are operated to displace a single transverse row articles 111 on the receptacle plate 120 intermittently onto the conveyor 104 (see FIGS. 15e and 15f).

Having described the invention in connection with several embodiments thereof, it should be understood that a number of changes, modifications and substitutions will readily occur to one skilled in the art without departing from the spirit and scope of the invention as defined by the appended claims.

What is claimed is:

1. Article containment apparatus comprising a stowage cabinet having a plurality of shelves disposed at different elevations and each adapted to place articles thereon, and elevating mechanism for moving the plurality of shelves up and down, a conveyor for conveying articles, and a plurality of infeeders disposed between the shelves and the conveyor for storing a given quantity of articles supplied from the conveyor thereon and for sequentially feeding the stored content thereon onto one of the shelves, the plurality of infeeders being alternately operated so that while one infeeder is storing articles supplied from the conveyor, another infeeder operates to feed the articles which are stored thereon onto said one shelf, a given said infeeder comprising a movable control member disposed for abutment against articles placed on the shelf for constraining a movement thereof, a receptacle plate which is adapted to be driven for forward movement to place articles on the shelf onto the receptacle plate as the receptacle plate is inserted between the shelf and the articles thereon, which articles are constrained from movement by the movable control member, the receptacle plate also being adapted to be driven for retracting movement to deliver the articles placed thereon off of the shelf, a first drive mechanism for causing a reciprocating movement of the receptacle plate, and a second drive mechanism for causing a reciprocating movement of the movable control member, the second drive mechanism being operative, when the receptacle plate is inserted between the shelf and the articles to have the articles placed thereon, to move the movable control member backward so as to shift the articles placed on the receptacle plate toward the center thereof.

2. Article containment apparatus according to claim 1 in which the first and the second drive mechanism operate to retract both the movable control member and the receptacle plate at the same speed after the articles placed on the receptacle plate have been shifted toward the center thereof by the action of the movable control member, thereby allowing the receptacle plate to be retracted while the articles placed thereon are supported by the control member.

3. Article containment apparatus, comprising:
a stowage cabinet accommodating a plurality of shelves for supporting articles placed thereon, and
an elevating mechanism for moving said plurality of shelves up and down;
a conveyor for conveying articles; and
an infeeder disposed between said conveyor and said stowage cabinet for reversibly transferring articles between said conveyor and each of said shelves, namely from said conveyor to said shelves and alternatively from said shelves to said conveyor, said infeeder including:
(1) means defining a receptacle plate movable advancingly and retreatingly, respectively,
  (a) for advancing insertion between an opposed one of said shelves and a quantity of articles on said one shelf to thereby scoop said quantity of articles off said shelf onto said receptacle plate for the purpose of delivery to said conveyor, and alternatively
  (b) for slipping out retreatingly from between a said shelf and a quantity of articles delivered by said receptacle plate from said conveyor, to thereby deposit and articles on said shelf;
(2) means defining a drive mechanism actuable
  (a) for advancing said receptacle plate from proximity with said conveyor to a position atop an opposed one of said shelves and therewith for either said scooping off a quantity of articles from said shelf or said depositing a quantity of articles from said conveyor on said shelf, and alternatively,
  (b) for retreating said receptacle plate from atop a given said shelf back into proximity with said conveyor; and
(3) transfer means actuable to abut against articles on said receptacle plate and move articles on said receptacle plate
  (a) for abutting and pushing articles from said receptacle plate onto said conveyor to assist said delivery of articles to said conveyor, and alternatively,
  (b) for abutting, and therewith restricting retreat of, articles during retreat of said receptacle plate from said shelf to assist said deposit of articles on to said shelf.

4. Article containment apparatus according to claim 3 in which the infeeder further comprises a guide member disposed substantially horizontally and extending across the shelf and the conveyor and including a portion which is curved downward at a point close to the conveyor, the receptacle plate being flexible so as to be guided for movement along the guide member including its curved portion, the transfer means including a control member disposed for abutment against articles which are deposited onto the shelf for preventing those articles from being retracted toward the conveyor as the receptacle plate is retracted, the drive mechanism operating to drive the receptacle plate incrementally as the articles are supplied thereto from the conveyor.

5. Article containment apparatus according to claim 3 in which the infeeder further comprises a guide member disposed between the shelf and the conveyor and spaced from the shelf by a given clearance, said receptacle plate being disposed for running along the guide member, a relay member extending across the guide member and the shelf for supporting the receptacle plate as it runs from the guide member to the shelf, said transfer means including a control member disposed for abutment against articles which are deposited onto the shelf for preventing those articles from being retracted toward the conveyor as the receptacle is retracted, the relay member being movable between a forwardly extended position in which it is capable of supporting the receptacle plate as it runs from the guide member to the shelf and a retracted position in which it secures a given clearance between the guide member and the shelf.

6. Article containment apparatus according to claim 3 in which the infeeder further comprises a support frame disposed between the shelf and the conveyor, said drive mechanism comprising a first sprocket mounted on the support frame adjacent to the shelf and a second sprocket mounted on the support frame adjacent to the conveyor and endless chain extending around the both sprockets, said receptacle plate being disposed over the endless chain and having its end adjacent to the conveyor connected to the endless chain in a rockable manner, a support member mounted on the endless chain for supporting the lower portion of the receptacle located adjacent to the shelf, said drive mechanism causing a forward movement of the receptacle plate through the endless chain to thereby convey a given quantity of articles, which are supplied from the conveyor onto the receptacle plate, onto the shelf said transfer means including a control member disposed for abutment against the articles which are conveyed onto the shelf for preventing those articles from being retracted toward the conveyor as the receptacle plate is retracted, the support member moving downward around the first sprocket after the leading end of the receptacle plate has been advanced to a location above the shelf, whereby the leading end of the receptacle plate is lowered for sliding contact with the surface of the shelf.

7. Article containment apparatus according to claim 3, further including a plurality of stowage cabinets, and further including a grouping unit disposed upstream of each stowage cabinet and operating to group a given number of articles together as the articles are conveyed in abutting relationship on the conveyor, and a guide rail disposed at least upstream of the grouping unit on the opposite sides of the conveyor, except for regions located in front of the respective stowage cabinet where the articles are conveyed from the conveyor into the infeeders.

8. Article containment apparatus according to claim 7, further including a single transfer unit disposed between the plurality of stowage cabinets and the single conveyor and including a plurality of infeeders, the transfer unit sequentially moving across the conveyor and the plurality of stowage cabinets in which the articles are to be stowed.

9. Article containment apparatus according to claim 3, wherein said transfer means includes a movable control member for said abutting and restricting the retreat of articles during retreat of said receptacle plate when the articles are deposited onto said shelf, and a traverse means for said abutting and pushing of articles from said receptacle plate onto said conveyor, after the articles have been scooped from said shelf by said receptacle plate.

10. Article containment apparatus according to claim 3, wherein a plurality of said infeeders are provided, said infeeders being operable in an alternate fashion when feeding articles from said conveyor to a shelf such that the articles supported on the receptacle plate of one infeeder are fed onto a said shelf while articles are fed from said conveyor to the receptacle plate of another infeeder.

11. Article containment apparatus according to claim 10, wherein plural infeeders are provided, said infeeders being operable simultaneously when feeding out articles from said shelf for feeding articles from said shelf to several receptacle plates at the same time.

* * * * *

UNITED STATES PATENT AND TRADEMARK OFFICE
CERTIFICATE OF CORRECTION

PATENT NO. : 4,815,921

DATED : March 28, 1989

INVENTOR(S) : Katsuyuki YAMAMOTO, Kazutoyo ITOH, Kazuo KISHIMOTO, Wakio YAMASHITA It is certified that error appears in the above-identified patent and that said Letters Patent is hereby corrected as shown below:

Col. 16, line 21; change "deposit and articles" to ---deposit said articles-

Signed and Sealed this

Fourteenth Day of November, 1989

*Attest:*

JEFFREY M. SAMUELS

*Attesting Officer*     *Acting Commissioner of Patents and Trademarks*